United States Patent [19]

Booth

[11] Patent Number: 5,406,488
[45] Date of Patent: Apr. 11, 1995

[54] CORRECTION OF ERRORS IN AUTOPILOTS

[75] Inventor: Thomas B. Booth, Hillhead Hants, Great Britain

[73] Assignee: The Secretary of State for Defence in Her Britannic Majesty's Government of the United Kingdom of Great Britain and Northern Ireland, London, Great Britain

[21] Appl. No.: 83,332

[22] Filed: Jun. 29, 1993

Related U.S. Application Data

[63] Continuation of Ser. No. 457,703, Jan. 8, 1990, abandoned.

[30] Foreign Application Priority Data

May 6, 1987 [GB] United Kingdom .................. 871079

[51] Int. Cl.$^6$ ............................................. G05D 1/00
[52] U.S. Cl. ................... 364/433; 244/76 R; 244/194; 318/588
[58] Field of Search ............... 364/433, 434, 435, 149, 364/150, 151, 164, 165, 578; 318/588, 589; 244/3.1, 3.15, 76 R, 175, 176, 194, 195

[56] References Cited

U.S. PATENT DOCUMENTS

| | | | |
|---|---|---|---|
| 2,712,414 | 7/1955 | Ziebolz et al. | 364/149 |
| 3,221,230 | 11/1965 | Osburn | 364/165 X |
| 3,758,762 | 9/1973 | Littman et al. | 364/149 X |
| 3,795,799 | 3/1974 | Courtiol | 364/150 |
| 4,046,341 | 9/1977 | Quinlivan | 244/181 |
| 4,106,094 | 8/1978 | Land | 364/453 |
| 4,148,452 | 4/1979 | Niessen et al. | 244/195 |
| 4,358,822 | 11/1982 | Sanchez | 364/164 X |
| 4,567,564 | 1/1986 | Bittner et al. | 364/434 |
| 4,577,270 | 3/1986 | Sugano et al. | 364/164 X |
| 4,663,703 | 5/1987 | Axelby et al. | 364/149 |
| 4,760,530 | 7/1988 | Liden | 364/148 X |
| 4,769,766 | 9/1988 | Tung | 364/149 X |
| 4,791,548 | 12/1988 | Yoshikawa | 364/164 X |
| 4,797,835 | 1/1989 | Kurami et al. | 364/149 X |
| 5,034,312 | 7/1991 | Saito | 364/149 X |

FOREIGN PATENT DOCUMENTS

| | | |
|---|---|---|
| 0071445 | 10/1984 | European Pat. Off. . |
| 1169596 | 11/1969 | United Kingdom . |
| 1345225 | 1/1974 | United Kingdom . |
| 1416268 | 12/1975 | United Kingdom . |
| 1535761 | 12/1978 | United Kingdom . |
| 2129969 | 11/1985 | United Kingdom . |

OTHER PUBLICATIONS

David W. Taylor Naval Ship Research and Development Center; Jun. 1979; "DTNSRDC Revised Standard Submarine Equations of Motion"; J. Feldman.

Proceedings of the 1986 American Control Conference, 18–20 Jun. 1986 (Seattle Wash., US), vol. 2, 19 Jun. 1986, 86CH2336-6, R. J. Martin et al "Multivariable Control of a Submersible Using the LQG/LTR design methodology", pp. 1313–1324.

Primary Examiner—Vincent N. Trans
Attorney, Agent, or Firm—Nixon & Vanderhye

[57] ABSTRACT

A system (1) responds to inputs (2) in parallel with a state estimator (4). The controller (6) provides the inputs (2) in response to ordered state inputs (14) and state estimator inputs. An external disturbance vector (f) affects the system (1) so that the observed values of the state variables are not the same as the estimated values. The estimated and measured values are compared (8) to give an error signal (9). The error values are fed to an Ordered State Corrector (11) which computes the error that the order state variable would have in the steady and applies it in the opposite sense to increment the input ordered state (14). If more than one state variable is to be corrected, the correction is applied directly to the control inputs using Multi-State Correction, in which the steady state errors are used to find the control inputs which would cause the errors and then a correction is applied to the control inputs.

17 Claims, 3 Drawing Sheets

CORRECTION OF ERRORS IN AUTOPILOTS

This is a continuation of application Ser. No. 07/457,703, filed Jan. 8, 1990, now abandoned.

BACKGROUND OF THE INVENTION

1. Field of the Invention

The invention relates to the correction of errors in achieving required states as determined by a controller, such as, for example, an autopilot.

In particular, the invention relates to the correction of errors due to an unknown disturbance of non-zero mean.

2. Discussion of Prior Art

When a system is subjected to an unknown constant disturbance, the variables which the state of the system (state variables) cannot, in general, be brought to desired values (the ordered state) by an automatic controller whose inputs consist solely of the differences between the actual and the ordered state (the state errors). The inclusions of derivatives of the state variables does not remedy matters.

Herein, the term "desired state" or "desired value" is used to denote the values desired by the operator, or by an automatic system controlling the operation of an autopilot. The term "ordered state" is used to denote the input settings of the autopilot, by which the desired values are input to the autopilot.

This controller problem can be illustrated by the following examples:

a) A controller depending on inputs of the depth error, pitch angle and their derivatives cannot bring a submarine to ordered depth if the submarine is out of trim (due to, for example, external loads, incorrect ballast or hydroplane offsets). The addition of heave velocity and pitch rate terms is unable to remedy the problem;

b) A similar controller whose input is course error cannot bring ships or submarines to their ordered course when they are subjected to, for example, wind or steering offsets. The addition of sway velocity and yaw rate terms does not remedy the problem;

c) Similarly to (b), ordered track cannot be achieved by a controller of this type whose inputs are distance off track and course error. In the same way as in (b), the addition of sway velocity and yaw rate terms cannot remedy this problem.

The control outputs of these controllers are proportional to the state variables, and their derivatives. Hence they are called Proportional Derivative (PD) controllers. PD controllers are simple controllers and are commonly fitted to ships and submarines. In a submarine, for example, the hydroplane deflection is proportional to terms in the depth error (i.e. actual depth-ordered depth) and pitch angel, and their derivatives. Under a constant disturbing force. e.g. out of trim, the controller maintains a constant, but inaccurate depth.

The shortcomings of a PD controller become serious when accurate achievement of a particular ordered state is important, such as when accurate navigation or depth keeping is needed. The addition of a term which is the integral of the appropriate state error variable, as in a Proportional Integral Derivative (PID) controller, can overcome the problem. However, though this can remove the steady state error, it reduces the stability of the system and serious difficulties arise when a change is made in the ordered state. A change in the ordered state creates a step in the corresponding state error variable. Left to itself, the integrator will integrate the error throughout the transition and can only correct itself by a massive overshoot. This can be mitigated by freezing or resetting the integrator, but the problem reappears when the integrator has to be released. There is, as well, the problem of how and when the integrator is to be switched out and reintroduced. Situations will always be possible in which highly undesirable side effects can occur, such as massive overshoot or the integrator not switching back in at all. These shortcomings of the PID controller become serious when, for example, a submarine wishes to ascent to a particular depth, e.g. periscope depth, with no or minimal overshoot.

In any of the systems described above, as an alternative to the integrator, the steady state error could be corrected manually by observing the error and adjusting the ordered state accordingly. This technique requires the steady state to be achieved and observed before the correction can be made. It cannot be applied during a manoeuvre, and it has to be repeated whenever the disturbing force changes. For example, the correction cannot be ascertained during a submarine's depth change. The direct automatic implementation of this technique (by automatically applying the steady state error in the opposite sense to the ordered value) fails, because success requires the error to be removed, and the necessary correction signal thereby vanished also. A successful implementation would require an integrator, or something like it, the disadvantages of which have been described above.

Another manual procedure, similar to that described in the preceding paragraph, uses the steady state errors to calculate offsets which are applied to the controls. This technique is open to the same objections and cannot be implemented automatically.

Everything that has been stated about a constant disturbance applies also to a varying disturbance with a non-zero mean, including a mean which is varying slowly compared with the response of the system. The objective is to bring the means state to the ordered state.

Waves constitute a varying disturbance to a submarine. They affect the system in three ways:

1. Pressure fluctuation proportional to wave height are picked up by the depth sensors, causing futile flapping of the hydroplanes, which causes excessive wear and noise;
2. Oscillatory forces cause the submarine to surge, heave and pitch. These do not affect the means depth, and the control system must ignore them since they are too large to be opposed;
3. A second-order force, commonly referred to as 'suction force', acts in an upwards direction only. It has a non-zero mean which must be opposed by the control system.

All three effects increase rapidly as the surface is approached. The ascent of a submarine to periscope depth therefore presents a particularly difficult problem. It must be achieved with minimal overshoot by a manoeuvre during which wave effects, which have an unknown but non-zero mean, are increasing.

Modern autopilots minimise the effects of the higher frequencies of the disturbances. They compute the most probable values of all the state variables (for a submarine there include the heave velocity, pitch rate, pitch angle and depth) from measurements that may be noisy. This is done by a state estimator, which models the system. Its output, when subject to the same controls inputs (for example, the hydroplane deflections), is compared with those actually occurring. Ideally, the estimation errors (observed state—estimated state) should be zero. (There is a distinction between the estimation errors, the state errors ie actual-ordered, and the estimated state errors ie estimated-ordered). In practice there are discrepancies due, for example, to the wave effects. By feeding back the estimation errors (those that can be measured), to the model via a Kalman filter, the estimates can be improved. The controller is similar to the PD controller. It includes terms proportional to the estimated state errors. This type of autopilot, possibly with additional filtering, achieves better performance against disturbances at the higher frequencies such as wave frequencies, but it offers no improvement against a constant or non-zero means disturbance. An integrator can be included but with the same disadvantages a the PID.

To summarise, the problem is to bring the mean state to the ordered state in a way which overcomes the difficulties of changing the ordered state. It is common to all autopilots and to many other controlled systems. It cannot be dealt with by presently available systems.

SUMMARY OF THE INVENTION

The object of the invention is to provide a means to accurately achieve a desired state in the presence of unknown disturbances. In particular it is an object of the invention to provide a means to facilitate accurate changing of the ordered state without reducing the stability of the system and without impairing the trajectory (ie the change in the variable path) during the transition.

The invention provides an autopilot comprising:
a) means to provide control inputs to control one or more state variables of a system;
b) means to provide a model of the system;
c) means to estimate from the model of the system the values of the one or more state variables which are expected to occur in response to the control inputs;
d) means to set the desired values of the or each controlled state variable; and
e) means to provide measurement of the or each controlled state variable;

characterised in that the autopilot further includes:
f) means to compare the estimated values of state variables with their measured values by subtracting the estimated values from their corresponding measured values to give the estimation error values;
g) means to derive from the estimation error values the necessary correction to the control means to achieve the desired values, the estimation error values bypassing the model means prior to the control means; and
h) means to adjust the control inputs to produce the desired values of the or each state variable.

Preferably the means to provide a model of the system comprises a state estimator, as this is an effective way of providing a model of the system. Preferably the state estimator estimates, on line, the probable values of the state variables from observations. This enables the system to be controlled continuously during manoeuvres. As with all autopilot estimators, care must be taken in modelling the system. Preferably the state estimator includes a computer or microprocessor and the system is modelled by a computer program, as such an arrangement provides great versatility and the ability to deal with large amounts of data very quickly.

Preferably the means to provide control inputs to control the state variables comprises a controller. The controller is preferably a linear controller but need not necessarily be purely linear. Advantageously it can tolerate temporary non-linearities. Advantageously the controller takes the estimates from the state estimator as inputs, rather than the measured values obtained by direct observations, and provides the control inputs to the system. For example, in a submarine the control inputs could by hydroplane deflections or in a ship they could be rudder deflections. The arrangement of a state estimator and an controller enables effective and flexible control of the system to be achieved.

Preferably the means to compare the estimated values of the one or more state variables with their measured values comprises a comparator which subtracts the estimated value of the state variable from its measured value, to give an estimated value. Preferably the estimation error value is then used to derive the steady state error in the measured values. This arrangement is advantageous because the steady state error remains constant and by deriving the values of the steady state error the corrections necessary to remove it can be derived. It is not necessary with this arrangement to ever actually measure the steady state error. Conveniently the calculations are carried out by means of a computer program.

Preferably the means to set the desired values of the or each controlled state variable comprises means to enter an order state in the controller to set the value of the control input necessary to achieve the desired output state variable. This desired state may be ordered manually by an operator or automatically by an autopilot controller, in response to system demands.

If only one state variable is to be corrected, the correction to the control inputs is preferably achieved by applying an increment, positive or negative, to the ordered state. Alternatively the correction may be applied directly to the control inputs. If more than one state variable is to be corrected, the correction is preferably applied to the control inputs.

Incrementing the ordered state will be referred to as Ordered State Correction (OSC). In Ordered State Correction, the steady state error is derived and the ordered state is incremented accordingly. Preferably the steady state error in the ordered state is applied in a reverse manner to the ordered state to achieve the desired value of the state variable.

The correction to the control inputs to correct more than one state variable will be referred to as multi-State Correction (MSC). In Multi-State Correction, the steady state errors in the state variables are used to find the control inputs which would cause the errors and when a correction is applied to the control inputs.

In Ordered State Correction the change is preferably applied to the entered ordered state to provide the control input to the system which will produce the desired values of the state variable as originally ordered. In Multi-State Correction the estimation errors are preferably used to derive those values of the control inputs which would have produced the errors. The reverse of these values are then preferably applied to the control inputs to remove the errors.

Autopilots according to the invention may be used to control ships, submarines, aircraft, weapons and other vehicles.

Preferably the autopilot of the invention is adapted for use as a submarine autopilot. Preferably, in such an autopilot, the control inputs comprise hydroplane and rudder deflections and forward speed or propellor speed. Preferably the autopilot includes a state estimator to model the system. Such an autopilot can be used to control depth-keeping (for which it is particularly effective), course or track keeping etc.

In any system, noise (electrical, mechanical or other) can affect the accuracy of the signals. Thus, if there is any noise input the correction signals can be affected. Advantageously a filter is included to filter out noise from the steady state error signals. The filter is conveniently a simple lag, but may be another form of filtering if desired. The main autopilot will normally include a Kalman filter and possibly other filtering as well, but an additional filter of the correction channel is advantageous.

The invention further provides a method of correcting an autopilot subjected to errors of a non-zero mean, comprising the steps of:

1) inputting desired values of one or more state variables of a system into an autopilot controller in the form of ordered states;
2) providing control inputs to the system from the controller to achieve the states corresponding to the ordered states;
3) providing measurement of the actual values of the state variable of the system; and
4) modelling the system in a state estimator;

characterised in that the method includes the further steps of:

5) comparing the measured values of the state variables with the values estimated by the state estimator;
6) deriving an error signal by subtracting the estimated values from their corresponding measured values to give the error signal; and
7) using the error signal to provide a correction to the control inputs, the error signal bypassing the state estimator prior to providing correction to the control inputs, which brings the actual states closer to the ordered states.

Preferably, if only one state variable is to be corrected, the error signal is applied to the ordered state to provide an incremented ordered state, thus changing the control inputs in order to provide the desired state of the system. This is called Ordered State Correction (OSC).

Alternatively, if more than one state variable is to be corrected. The error signals are preferably used to determine what value of the control inputs would be expected to produce the measured values of the state variables. A correction can then be applied to the control inputs to eliminate the difference between the measured values of the state variables and the desired values. This is called Multi-State Correction (MSC). MSC can be used to correct an error in a single state variable but OSC is preferred in that case as it is simpler.

Preferably the increment or corrections are derived using a computer program. Preferably the computer program compares the measured values of the state variables with the estimated values. The estimation error can then be derived.

The invention also further comprises a computer programmed to correction errors of non-zero mean in an autopilot in accordance with the methods of the inventions.

BRIEF DESCRIPTION OF THE DRAWINGS

The invention will now be described, by way of example only, with reference to the drawings of which.

DETAILED DESCRIPTION OF PREFERRED EMBODIMENTS

Figure 1:
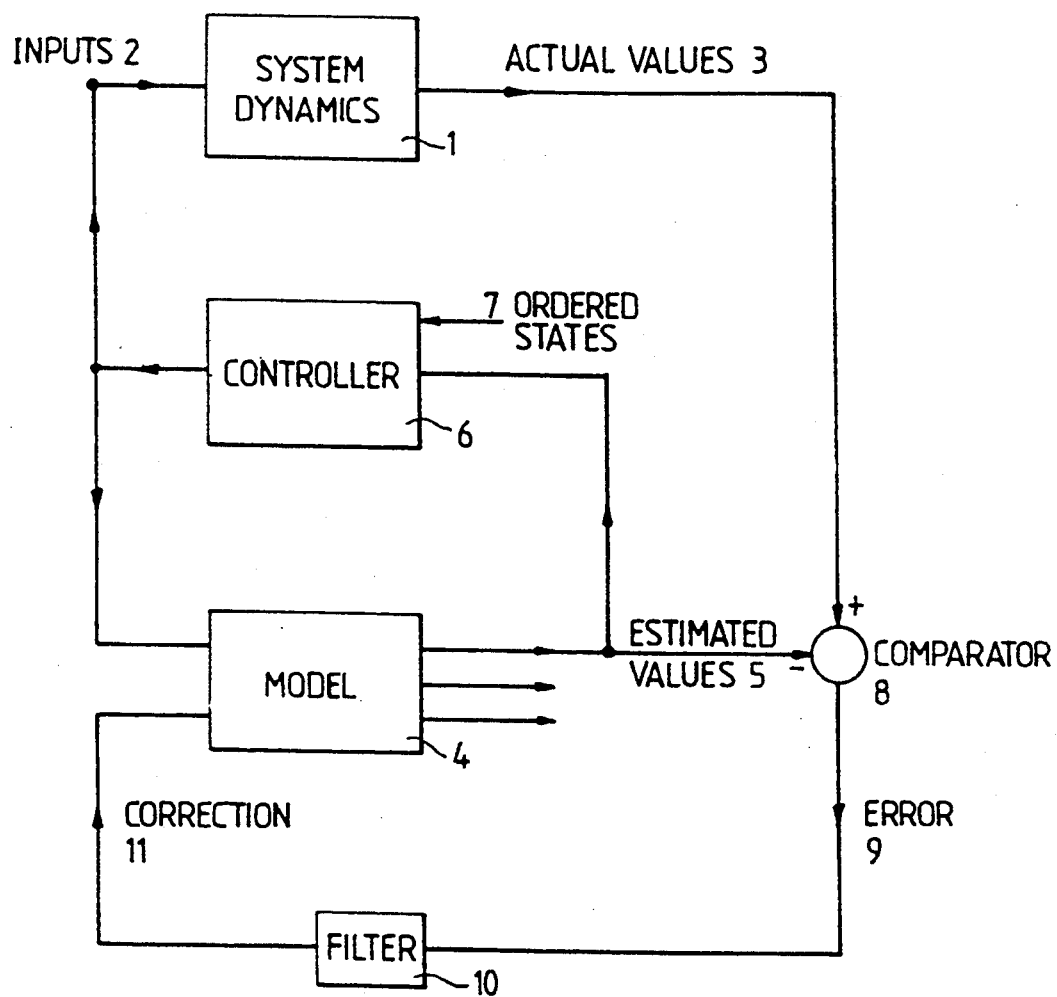
FIG. 1 is a flow diagram representing a general control system for controlling state variables.

FIG. 1 shows a simplified flow diagram of a general control system. The system is represented by its dynamics for those state variables of interest for control of the system. This is represented by block 1. The system at 1 is affected by inputs 2 to produce values of the state variables 3. The values of the inputs are also fed into a model of the system, represented at block 4, which produced the estimated values 5 of the state variables which would be expected from the system 1 in response to inputs 2. The inputs 2 are controlled by a controller represented by block 6 which is set to control the inputs 2 to the system to provide desired outputs 3 as set by ordered state inputs 7. The ordered state inputs 7 can be input at various positions in the control loop (e.g. into the state estimator 4) but the position where the resulting calculations are simplest is a direct input into the controller 6. The actual values 3 and the estimated values 5 are compared by a comparator 8 to produce estimation error values 9. If there is noise affecting the error signals a filter 10 is provided, which removes noise from the error signals 9 to provide signals 11 which are then fed back into the model to provide improved estimated values 5 which are used to bring the actual values 3 of the system 1 closer to the desired values for the system.

The invention will be described in relation to a submarine autopilot used for depth keeping.

Figure 2:
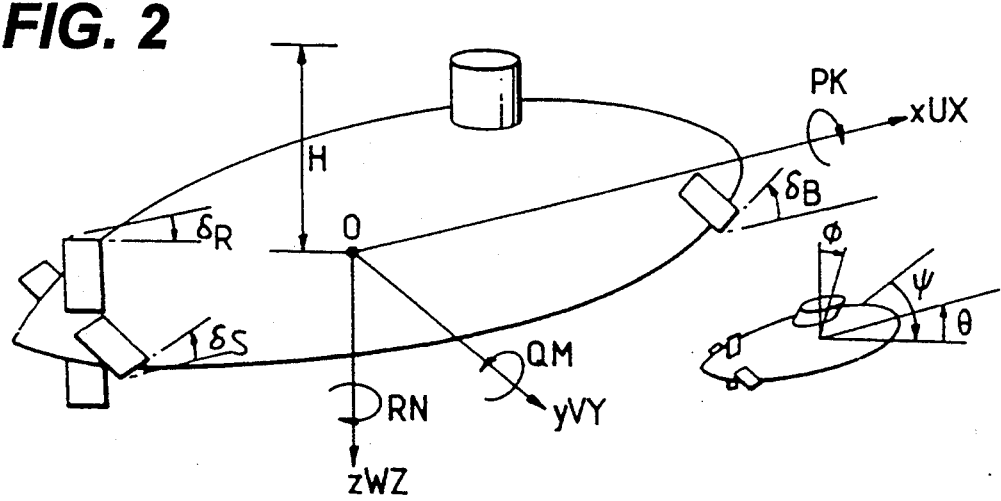
FIG. 2 is a diagram to indicate the notation used for underwater vehicle dynamics.

FIG. 2 is used to indicate the notation used. The symbols used are as follows:

| | |
|---|---|
| Oxyz | Body axes |
| $x_A\ y_A\ z_A$ etc | Co-ordinates of the point A, etc |
| $I_x\ I_y\ I_z$ | Moments of inertia referred to Oxyz |
| m | Mass |
| Mathematical Model | |
| Φ Θ Ψ | Modified Euler angles of roll, pitch and yaw |
| U V W | Velocity components |
| P Q R | Angular Velocity components |
| X Y Z | Force components |
| K M N | Moment components |
| H | Depth of 0 below mean level of free surface |
| $\delta_B\ \delta_S\ \delta_R$ | Bow plane, stem plane and rudder deflection |
| $X_{uu}'\ M_{uw}'\ N_{ur}'$ etc | Coefficients in force and moment expressions. |
| Disturbed Motion | |
| φ θ ψ | Roll, pitch and yaw increments |
| u v w | Velocity component increments |
| p q r | Angular Velocity component increments |
| ΔX ΔY ΔZ | Force component increments |
| ΔK ΔM ΔN | Moment component increments |
| h | Depth increment |

-continued

| | |
|---|---|
| $\delta_b$ $\delta_s$ $\delta_r$ | Control deflection increments |
| $X_u$ $M_n$ $N_r$ etc | Derivatives. |
| The 'dot' . | denotes differentiation with respect to time eg $\dot{H}$. |
| The 'bar' - | denotes the value of a variable in steady state motion eg $\bar{U}$. |
| The 'Prime' ' | denotes a non-dimensional quantity based on the units of | length l, mass $\frac{1}{2}$ e $l^3$, and time $l/\bar{U}$, eg $P' = \frac{Pl}{\bar{U}}$ , $M_w' = M_w / \frac{1}{2}$ e $l^3$ $\bar{U}$ Notation for Control
Control - State-space notation ($\dot{x} = A.x + B.u + D.f$) where

| | |
|---|---|
| X = | Vector of absolute state variables |
| Y = | Vector of absolute state observations |
| x = | Vector of state error variables |
| y = | Vector of state error observations |
| u = | Control input vector |
| f = | External disturbance vector |
| $\hat{X}$ $\hat{Y}$ $\hat{x}$ $\hat{y}$ | denote estimated values |
| $X_E$ = | Estimation error vector = $X - \hat{X}$ |
| $Y_E$ = | Observed estimation error vector = $Y - \hat{Y}$ |
| K = | Kalman gain matrix |
| L = | Controller gain matrix |
| U | is the vehicle forward speed. |

"Added mass"—when the speed of a body in a fluid is increased work must be done, not only to accelerate the body but also to increase the kinetic energy of the particles of the fluid. The effect is the same as if the mass of the body were increased and this component is commonly referred to as the "added mass". Its value depends on the direction of the acceleration. (No fluid is actually entrained and the effect does not require viscosity). In the same way there is an added moment of inertia. Added mass is of the same order as the mass of fluid displaced and is important for ships, submarines, airships and torpedoes. It is unimportant in relation to aircraft. Thus the effective mass in the downward direction for a submarine is $m_3$ where $m_3 = m - Z_{\dot{w}}$. The effective moment of inertia in the same plane is $I_2$ where $I_2 = I_y - M_{\dot{Q}}$.

Figure 3:
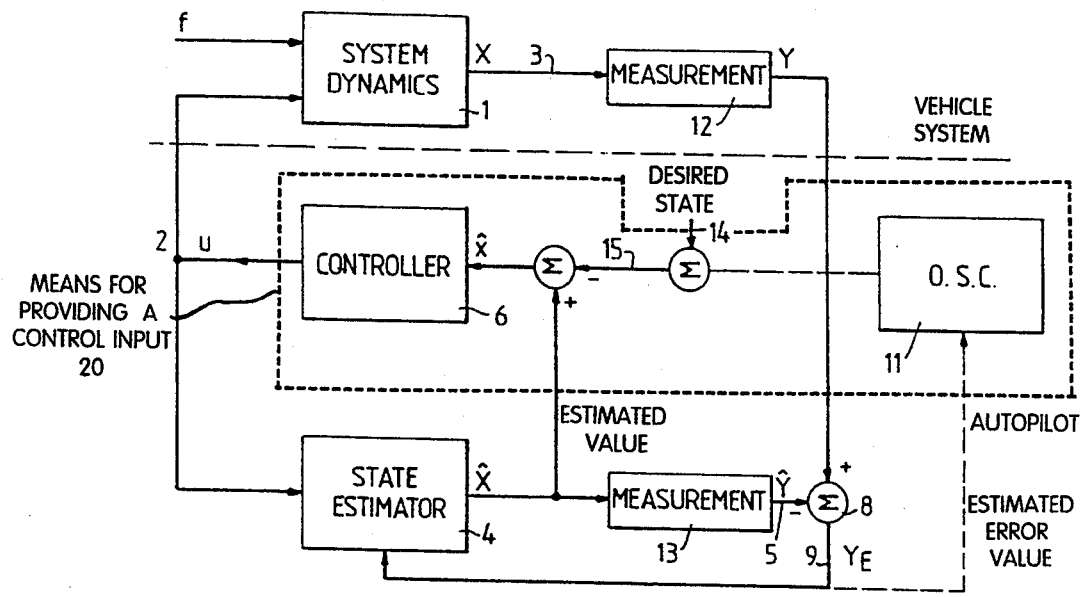
FIG. 3 is a flow diagram representing the operation of an autopilot with Ordered State Correction.

The OSC autopilot of FIG. 3 operates on corresponding principles to the general control system of FIG. 1. The system dynamics at block 1 respond to inputs 2 in parallel with a model of the system at block 4, which is here a state estimator. The controller 6 provides the inputs 2 as a control input vector u in response to ordered state inputs 14 and to inputs from the state estimator 4 to the controller 6. The system dynamics at 1 are, however, also subjected to an external disturbance vector f.

The values of the state variables 3 of the system 1 from the vector of absolute state variables X and are measured by appropriate means 12 to give the vector of absolute state observations Y.

In the same way, the state estimator 4 provides the estimate vector $\hat{X}$ and measurement means 13 provide the vector $\hat{Y}$ of the estimated values of the observations 5.

Figure 5:
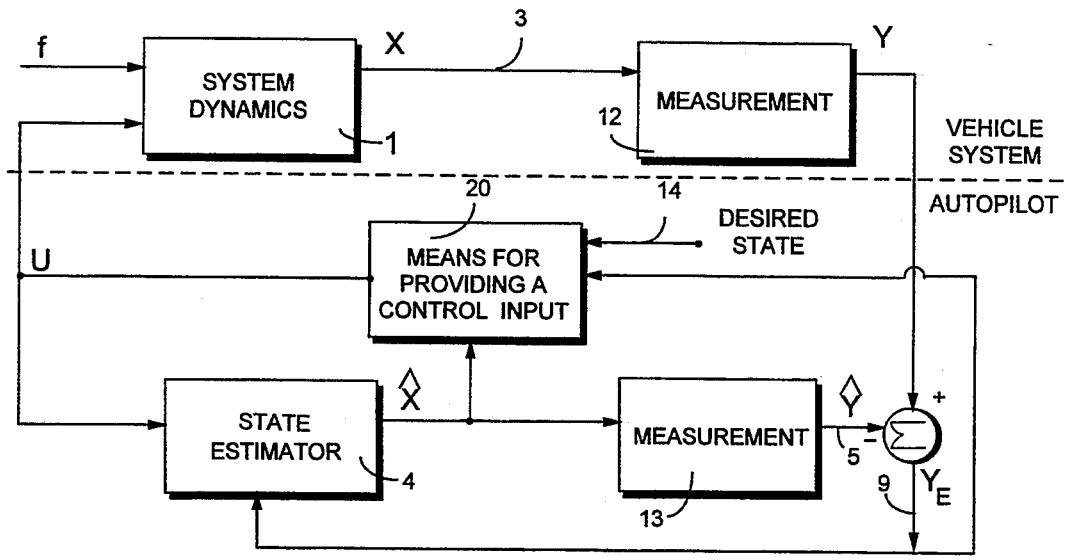
FIG. 5 is a block diagram of a generic embodiment of the present invention.
Figure 6:
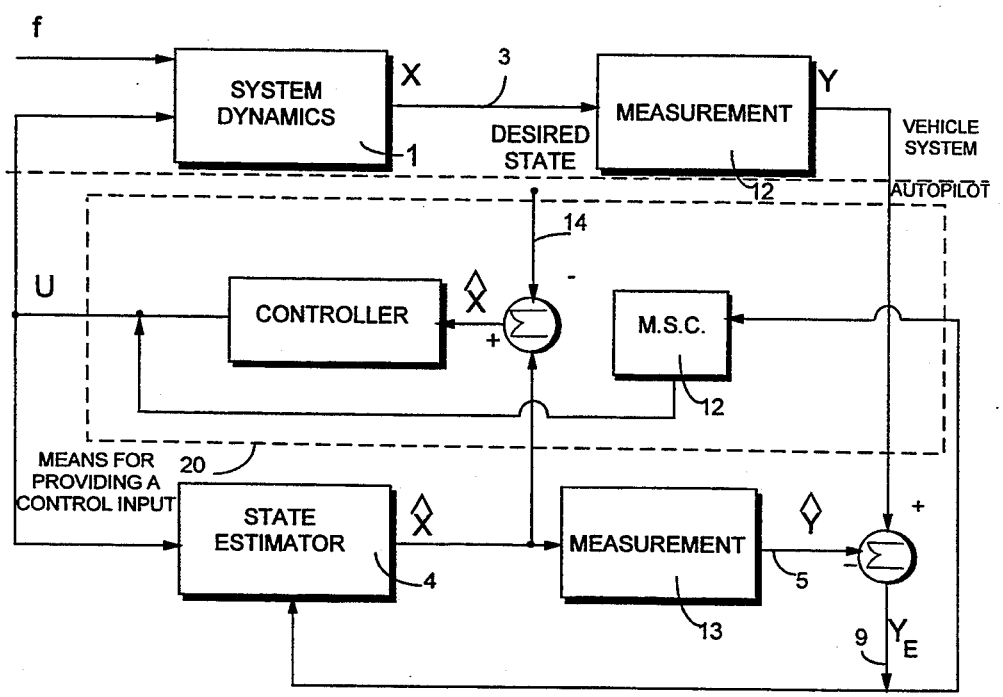
FIG. 6 is a block diagram representing the operation of an autopilot with multi-state correction.

The presence of the external disturbance vector f affects the dynamics of the system 1 so that the values of the state variables X, and the observed values Y are not the same as the estimated values $\hat{X}$ and $\hat{Y}$, respectively. The values Y and $\hat{Y}$ are compared by means of a comparator 8 to give an error signal output 9 of the observed estimation error vector $Y_E = Y - \hat{Y}$. The signal 9 of $Y_E$ is fed back to the state estimator 4 to enable improved estimated values $\hat{X}$ to be produced. The error values $Y_E$ are also fed to an Ordered State Corrector 11 which computes the error (actual-ordered) that the ordered state variable would have in the mean or steady state and applies it in the opposite sense so as to increment the input ordered state 14, such that the error in the mean or steady state is reduced to zero. The controller 6, the Ordered State Corrector 11 and the summing junctions shown in dotted line box 20 comprise a means for providing a control output which is responsive to the desired state input 14, the estimated value X and the estimation error value $Y_E$. FIG. 5 is a generic view of the present invention with FIG. 6 illustrating the MSC embodiment of the present invention showing Multi-State Corrector 12 which applies a reversal of the estimation error to the control input u. The incremented ordered state signal 15 thus causes the controller to provide a modified control input vector u which will produce the desired output X from system 1 in the presence of the disturbance vector f. OSC can be implemented without the need to establish a steady state prior to the adjustment.

The implementation of the technique will be described with reference to FIG. 4 as well. The illustrative example being used is that of submarine depth-keeping and the equations of submarine motion are therefore first written in state space form:

$$m_3 \dot{W} = Z_W W + Z_Q Q + Z_{\delta_B} \delta_B + Z_{\delta_S} \delta_S + Z$$

$$I_2 \dot{Q} = M_W W + M_Q Q + M_\Theta \Theta + M_{\delta_B} \delta_B + M_{\delta_S} \delta_S + M$$

$$\dot{\Theta} = Q$$

$$\dot{H} = W - U.\Theta$$

The state space notation gives:

$$\dot{X} = A.X + B.u + D.f$$

where:

$X = [W, Q, \Theta, H]^T, u = [\delta_B, \delta_S]^T, f = [Z, M, 0, 0]^T$ $$A = \begin{bmatrix} Z_W/m_3, & Z_Q/m_3, & 0, & 0 \\ M_W/I_2, & M_Q/I_2, & M_\Theta/I_2, & 0 \\ 0, & 1, & 0, & 0 \\ 1, & 0, & -U, & 0 \end{bmatrix}$$

$$B = \begin{bmatrix} Z_{\delta_B}/m_3 & Z_{\delta_S}/m_3 \\ M_{\delta_B}/I_2, & M_{\delta_S}/I_2 \\ 0, & 0 \\ 0, & 0 \end{bmatrix}$$

$$D = \begin{bmatrix} 1/m_3, & 0 \\ 0, & 1/I_2 \\ 0, & 0 \\ 0, & 0 \end{bmatrix}$$

For observations of depth and pitch angle $Y=[H, \Theta]^T$ and the measurement matrix $$C = \begin{bmatrix} 0, 0, 0, 1 \\ 0, 0, 1, 0 \end{bmatrix}$$

Figure 4:
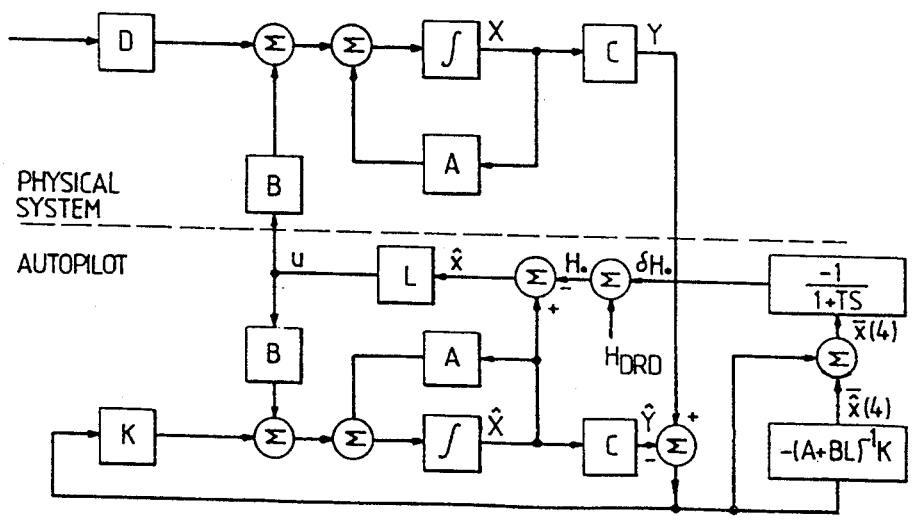
FIG. 4 is a matrix flow diagram for the system represented in FIG. 3.

FIG. 4 shows the matrix flow diagram corresponding to FIG. 3

For the system dynamics $\dot{X} = A \cdot X + B \cdot u + D \cdot f$

For the state estimator $\dot{\hat{X}} = A \cdot \hat{X} + B \cdot u + K(Y - \hat{Y})$
$= A \cdot \hat{X} + B \cdot u + K \cdot C(X - \hat{X})$ Subtracting $\dot{X} - \dot{\hat{X}} = A(X - \hat{X}) - K \cdot C(X - \hat{X}) + D \cdot f$ giving $\dot{X}_E = (A - K \cdot C) X_E + D \cdot f$ Thus $X_E$ depends solely on f, whatever the manoeuvre the system may make.

Provided the determinant $A - K.C.$ is not singular, $X_E$ will attain steady values given by $X_E = -(A-K.C.)^{-1} D.f$. It follows that $Y_E$ will also achieve steady values.

In the steady state of the whole system under auto control, and inserting the controller relation $u = Lx$, the autopilot equation is $$0 = A.\bar{\hat{X}} + B.L.\bar{\hat{x}} + K.Y_E$$

and for a system which is not sensitive to the ordered variable $$A.\bar{\hat{X}} = A.\bar{\hat{x}}$$

Hence $(A+B.L)\bar{\hat{x}} = -K.Y_E$
giving $\bar{\hat{x}} = -(A+B.L)^{-1} K.Y_E$
Hence the estimated value of the ordered variable $\bar{\hat{x}}(4)$ (the steady state estimated depth error) can be derived. Hence $$\bar{x}_4 = (\bar{x}_4 - \bar{\hat{x}}_4) + \bar{\hat{x}}_4$$
$$= Y_{E1} + \bar{\hat{x}}_4$$

since the observed value of $X_4$ is $Y_1$ (i.e. H).

Thus the depth error in the steady state is found from quantities which can be observed during a manoeuvre. This value ($\delta H_{ord}$) is applied in the opposite sense to correct the ordered state (Hord), with the result that the error in the steady state is reduced to zero (though it should be noted that, in general, neither $Y_E$ nor $\hat{x}$ will become zero as well).

Since $Y_E$ achieves a steady value independently of the system as a whole, the addition of the OSC channel has not effect on the stability of the system.

OSC automatically computes the error which would occur in the steady state and adjusts the ordered state accordingly. There is no need to establish a steady state prior to the adjustment. It is valid provided the disturbing force and the other state variables are independent of, or insignificantly changed by, the correction.

The presence of a constant disturbing force is revealed by non-zero mean values of the estimation errors. These mean values can be shown to depend only on the disturbance and the vehicle forward speed. They are unaffected by manoeuvring and depth changing. Thus the steady state depth keeping error can be found from the mean estimation errors (though the depth keeping error is not the same as the estimation error of depth) and can be applied in reverse to the ordered depth, thus correcting the depth keeping. This technique overcomes all the problems of the integrator and is stable and robust. Once the steady state error and correction have been found for a particular depth, it will need only minor, if any, adjustment as it is moved to another ordered depth.

When one ordered state variable is changed, changes in another state variable may occur e.g. change of depth causes changes in pitch. OSC can be operated even when a limit to the secondary changes is included e.g. a pitch limiter. With other systems the introduction of a pitch limit causes such complicated effects that ordered depth may not be attained. However, pitch limiting has no adverse affect on OSC as OSC will change the depth at which the limit ceases to operate so that achievement of the corrected state can be achieved cleanly.

External forces can pose even greater problems such as the effect of a "seaway" on depth keeping of a submarine. In this situation there is an upward force which constantly pulls the submarine out of trim. In a strong seaway, present autopilots without integrators would be unable to keep the submarine below the surface. OCS can keep it within normal depth tolerances. Those that include integrators would be unable to change depth in autocontrol, whereas OSC can.

The wave forces have a non-zero means (suction force) which is opposed by the OSC. Even if the submarine has no knowledge of the sea state and is not ballasted against it, OSC can achieve clean flare out to a new depth with the overshoot being within the motion occurring normally.

OSC is comparable to (or slightly better than) the integrator system at simple depth keeping but is vastly superior when the ordered depth is changed as it can change to the new depth very accurately with no undesirable overshoot or other complications.

OSC will remove one steady state error, and this may be all that is required, but it cannot remove more than one. For example it cannot correct the depth keeping and simultaneously remove a steady state pitch angle. (If OSC is applied to both depth keeping and pitch they will interact against each other).

Multi-state correction (MSC) is an alternative technique which is not limited in this way. Once again the key is the constancy of the mean values of the estimation error. If the hydroplane deflections needed to produce this error are found, they can be applied in reverse as offsets to the hydroplanes, thus correcting both depth keeping and zeroing the pitch angle. The principle of operation is similar to that described for OSC with reference to FIGS. 3 and 4. If the controls can be offset, by $\mu$ say, so as to balance the disturbance, ie $b.\mu + D.f = 0$, then MSC enables the vector $\mu$ to be calculated on line during any manoeuvre. Having neutralised the disturbance, the controller brings the system exactly to the ordered state. (There are some limitations on controllability, e.g. two or more variables cannot be controlled independently by a single control, nor can it be assumed that $B.\mu + D.f = 0$ has a solution, but these do not arise with the submarine).

Provided $\mu$ is included in the feedback to the autopilot B matrix (FIG. 4) then $$\dot{X} = A.X + B(u+\mu) + D.f$$

$$\dot{\hat{X}} = A.\hat{X} + B(u+\mu) + K(Y-\hat{Y})$$

and as before $$\dot{X}_E = (A - K.C)X_E + D.f$$

so that $X_E$ and $Y_E$ tend to constant values whatever the manoeuvre.

For the steady state of the whole system in auto control $$0 = A.\bar{\hat{X}} + B.L.\bar{\hat{x}} + B.\mu + K.\bar{Y}_E$$

As before $A.\bar{\hat{X}} = A.\bar{\hat{x}}$ and $\bar{Y}_E = \bar{y}_E$ giving $$0 = (A + B.L)\bar{\hat{x}} + B.\mu + K.\bar{y}_E$$

If $(A+B.L) = \Lambda$, the equation may be partitioned to read $$0 = \begin{bmatrix} \Lambda_1 | \Lambda_2 \\ \Lambda_3 | \Lambda_4 \end{bmatrix} \begin{bmatrix} \bar{\hat{x}}_{12} \\ \bar{\hat{x}}_{34} \end{bmatrix} + \begin{bmatrix} B_1 \\ B_2 \end{bmatrix} \mu + [K_1 | K_2] \bar{y}_E$$

where $\hat{x}_{12} = \begin{bmatrix} \hat{x}_1 \\ \hat{x}_2 \end{bmatrix} \hat{x}_{34} = \begin{bmatrix} \hat{x}_3 \\ \hat{x}_4 \end{bmatrix}$ Eliminating $\bar{\hat{x}}_{12}$ by multiplying the upper and lower equations by $\Lambda_1^{-1}$ and $\Lambda_3^{-1}$ respectively and subtracting gives $$(\Lambda_1^{-1}\Lambda_2 - \Lambda_3^{-1}\Lambda_4)\bar{\hat{x}}_{34} + (\Lambda_1^{-1}B_1 - \Lambda_3^{-1}B_2)\mu + (\Lambda_1^{-1}K_1 - \Lambda_3^{-1}K_2)\bar{y}_E = 0$$

Also $\bar{\hat{x}}_{34} = -(\bar{x}_{34} - \bar{\hat{x}}_{34}) + \bar{x}_{34} = -C_2^{-1}\bar{y}_E + \bar{x}_{34}$
and in the required state $\bar{x}_{34} = 0$ giving $(\Lambda_1^{-1}B_1 - \Lambda_3^{-1}B_2)\mu =$ $$((\Lambda_1^{-1}\Lambda_2 - \Lambda_3^{-1}\Lambda_4)C_2^{-1} - \Lambda_1^{-1}K_1 + \Lambda_3^{-1}K_2)\bar{y}_E$$

$$\mu = (\Lambda_1^{-1}B_1 - \Lambda_1^{-1}B_2)^{-1}((\Lambda_1^{-1}\Lambda_2 - \Lambda_3^{-1}\Lambda_4)C_2^{-1} - \Lambda_1^{-1}K_1 + \Lambda_3^{-1}K_2)\bar{y}_E$$

As with OSC it is necessary to smooth the elements of $\mu$ $\bar{y}_E$. For the submarine, the computation simplifies considerably, and MSC gives more precise pitch limiting in a depth change than OSC. However, the offsets required to balance large disturbances, e.g. suction force, may cause saturation.

The A and B matrices are particularly speed sensitive and should be adjusted on line, if possible.

OSC and MSC are applicable not only to depth and pitch keeping but to course keeping, track keeping and any other type of autopilot controlled function. They are suitable for ship, submarine and weapon autopilots and could also be used for aircraft and are suitable for use with any system including a state estimator.

I claim:

1. An autopilot for the control of the physical state of a vehicle system such as ships, submarines, aircraft and weapons, said vehicle system having system dynamics responsive to at least one control input, wherein said autopilot can accurately maintain said vehicle system in a desired physical state in the presence of an unknown disturbance, said autopilot comprising:
   (a) means for providing a vehicle system state estimator comprising:
      an immutable model of said vehicle system, said model derived from characteristics of said vehicle system when operating within an environment free of unknown disturbances; and
      means, responsive to said immutable model and said at least one control input, for providing an estimated value of at least one state variable;
   (b) means for setting a desired value of said at least one state variable;
   (c) measurement means for providing a measured value of said at least one state variable;
   (d) comparison means for comparing said estimated value with a corresponding measured value by subtracting said estimated value from said corresponding measured value and for providing at least one estimation error value; and
   (e) means, responsive to said estimated value, to said at least one estimation error value and to said desired value, for providing said at least one control input to both said vehicle system and said means for providing a vehicle system state estimator, where said at leas tone control input, in combination with said vehicle dynamics, causes said at least one state variable to approach said desired value of said at least one state variable.

2. An autopilot according to claim 1, wherein said immutable model of said vehicle system includes one of a computer and microprocessor and said vehicle system is modeled by a computer program.

3. An autopilot according to claim 1, wherein said means for providing at least one control input includes a means for applying a function of said estimation error value as an offset to a control input component derived from said desired value and said estimated value.

4. An autopilot according to claim 1, wherein said vehicle system is a submarine.

5. An autopilot according to claim 1, wherein at least one of said means for providing at least one control input, said means for providing a vehicle system state estimator, said means for setting a desired value, said measurement means and said comparison means is implemented on a programmable computer.

6. An autopilot for the control of the physical state of a vehicle system such as ships, submarines, aircraft and weapons, said vehicle system having system dynamics responsive to at least one control input, wherein said autopilot can accurately maintain said vehicle system in a
   (a) means for providing a vehicle system state estimator comprising:
      an immutable model of said vehicle system, said model derived from characteristics of said vehicle system when operating within an environment free of unknown disturbances; and
      means, responsive to said immutable model and said at least one control input, for providing an estimated value of at least one state variable;
   (b) means for setting a desired value of said at least one state variable;
   (c) measurement means for providing a measured value of said at least one state variable;

(d) comparison means for comparing said estimated value with a corresponding measured value by subtracting said estimated value from said corresponding measured value and for providing at least one estimation error value; and (e) means, responsive to said estimated value, to said at least one estimation error value and to said desired value, for providing said at least one control input to both said vehicle system and said means for providing a vehicle system state estimator, where said at leas tone control input, in combination with said vehicle dynamics, causes said at least one state variable to approach said desired value of said at least one state variable, wherein said means for providing said at least one control input comprises:

an ordered state corrector, responsive to said at least one estimation error value, for providing an ordered state correction output;

first summer means for combining said desired value with said ordered state correction and for providing a first combined output;

a second summer means for combining said first summer combined output and said estimated value and for providing a second combined output; and controller means for providing said at least one control input in response to said second summer combined output.

7. An autopilot according to claim 6, wherein said means for setting a desired value of said at least one state variable comprises a means for adjusting a desired value of said at least one state variable.

8. An autopilot according to claim 7, wherein said means for providing said at least one control input includes means for applying one of a positive and negative increment to said desired value.

9. An autopilot for the control of the physical state of a vehicle system such as ships, submarines, aircraft and weapons, said vehicle system having system dynamics responsive to at least one control input, wherein said autopilot can accurately maintain said vehicle system in a desired physical state in the presence of an unknown disturbance, said autopilot comprising:

(a) means for providing a vehicle system state estimator comprising:

an immutable model of said vehicle system, said model derived from characteristics of said vehicle system when operating within an environment free of unknown disturbances; and means, responsive to said immutable model and said at least one control input, for providing an estimated value of at least one state variable;

(b) means for setting a desired value of said at least one state variable;

(c) measurement means for providing a measured value of said at least one state variable;

(d) comparison means for comparing said estimated value with a corresponding measured value by subtracting said estimated value from said corresponding measured value and for providing at least one estimation error value; and (e) means, responsive to said estimated value, to said at least one estimation error value and to said desired value, for providing said at least one control input to both said vehicle system and said means for providing a vehicle system state estimator, where said at leas tone control input, in combination with said vehicle dynamics, causes said at least one state variable to approach said desired value of said at least one state variable, wherein said means for providing said at least one control input comprises:

a multi-state corrector, responsive to said at least one estimation error value, for providing a multi-state correction output;

summing means for combining said desired value with said estimated value and for providing a summer output;

controller means for providing a controller means output in response to said summer output; and means for combining said multi-state correction output and said controller means output and for providing said at least one control input.

10. An autopilot according to claim 9, wherein said multi-state correction output is applied as an offset to said controller means output in order to provide said at least one control input.

11. An autopilot for the control of the physical state of a vehicle system such as ships, submarines, aircraft and weapons, said vehicle system having system dynamics responsive to at least one control input, wherein said autopilot can accurately maintain said vehicle system in a desired physical state in the presence of an unknown disturbance, said autopilot comprising:

(a) a vehicle system state estimator comprising:

an immutable model of said vehicle system, said model derived from characteristics of said vehicle system when operating within an environment free of unknown disturbances; and means, responsive to said immutable model and said at least one control input, for providing an estimated value of at least one state variable;

(b) means for setting a desired value of said at least one state variable;

(c) measurement means for providing a measured value of said at least one state variable;

(d) comparator for comparing said estimated value with a corresponding measured value by subtracting said estimated value from said corresponding measured value and for providing at least one estimation error value;

(e) an ordered state corrector, responsive to said at least one estimation error value, for providing an ordered state correction output;

(f) a first summer for combining said desired value with said ordered state correction and for providing a first combined output;

(g) a second summer for combining said first summer combined output and said estimated value and for providing a second combined output; and (h) controller for providing said at least one control input in response to said second summer combined output, wherein said ordered state corrector, said first summer, said second summer, and said controller comprises a means for providing said at least one control input to both said vehicle system and said vehicle system state estimator, where said at least one control input, in combination with said vehicle dynamics, causes said at least one state variable to approach said desired value of said at least one state variable.

12. An autopilot for the control of the physical state of a vehicle system such as ships, submarines, aircraft and weapons, said vehicle system having system dynamics responsive to at least one control input, wherein said autopilot can accurately maintain said vehicle system in a desired physical state in the presence of an unknown disturbance, said autopilot comprising:

(a) a vehicle system state estimator comprising:
- an immutable model of said vehicle system, said model derived from characteristics of said vehicle system when operating within an environment free of unknown disturbances; and
- means, responsive to said immutable model and said at least one control input, for providing an estimated value of at least one state variable;

(b) means for setting a desired value of said at least one state variable;

(c) measurement means for providing a measured value of said at least one state variable;

(d) comparator for comparing said estimated value with a corresponding measured value by subtracting said estimated value from said corresponding measured value and for providing at least one estimation error value;

(e) a multi-state corrector, responsive to said at least one estimation error value, for providing a multi-state correction output;

(f) a summer for combining said desired value with said estimated value and for providing a summer output;

(g) a controller for providing a controller means output in response to said summer output; and (h) means for combining said multi-state correction output and said controller output and for providing said at least one control input, said multi-state corrector, said summer, said controller and said means for combining all comprising a means for providing said at least one control input to both said vehicle system and said means for providing a vehicle system state estimator, where said at least one control input, in combination with said vehicle dynamics, causes said at least one state variable to approach said desired value of said at least one state variable.

13. An autopilot for the control of the physical state of a vehicle system such as ships, submarines, aircraft and weapons, said vehicle system having system dynamics responsive to at least one control input, wherein said autopilot can accurately maintain said vehicle system in a desired physical state in the presence of an unknown disturbance, said autopilot comprising:

(a) means for providing a vehicle system state estimator comprising:
- an immutable model of said vehicle system, said model derived from characteristics of said vehicle system when operating within an environment free of unknown disturbances; and
- means, responsive to said immutable model and said at least one control input, for providing an estimated value of at least one state variable;

(b) means for setting a desired value of said at least one state variable;

(c) measurement means for providing a measured value of said at least one state variable;

(d) comparison means for comparing said estimated value with a corresponding measured value by subtracting said estimated value from said corresponding measured value and for providing at least one estimation error value;

(e) a summer means for combining said desired value and said estimated value into a combined desired and estimated value; and (f) means, responsive to said at least one estimation error value and to said combined desired and estimated value, for providing said at least one control input to both said vehicle system and said means for providing a vehicle system state estimator, where said at least one control input, in combination with said vehicle dynamics, causes said at least one state variable to approach said desired value of said at least one state variable.

14. An autopilot for the control of the physical state of a vehicle system such as ships, submarines, aircraft and weapons, said vehicle system having system dynamics responsive to at least one control input, wherein said autopilot can accurately maintain said vehicle system in a desired physical state in the presence of an unknown disturbance, said autopilot comprising:

(a) means for providing a vehicle system state estimator comprising:
- an immutable model of said vehicle system, said model derived from characteristics of said vehicle system when operating within an environment free of unknown disturbances; and
- means, responsive to said immutable model and said at least one control input, for providing an estimated value of at least one state variable;

(b) means for setting a desired value of said at least one state variable;

(c) measurement means for providing a measured value of said at least one state variable;

(d) comparison means for comparing said estimated value with a corresponding measured value by subtracting said estimated value from said corresponding measured value and for providing at least one estimation error value; and (f) means, responsive to said estimated value, to said at least one estimation error value and to said desired value, for providing said at least one control input to both said vehicle system and said means for providing a vehicle system state estimator, said means for providing at least one control input comprising at least one summer means for combining at least the said desired value and the said estimated value, where said at least one control input, in combination with said vehicle dynamics, causes said at least one state variable to approach said desired value of said at least one state variable.

15. An autopilot for the control of the physical state of a vehicle system such as ships, submarines, aircraft and weapons, said vehicle system having system dynamics responsive to at least one control input, wherein said autopilot can accurately maintain said vehicle system in a desired physical state in the presence of an unknown disturbance, said autopilot comprising:

(a) means for providing a vehicle system state estimator comprising:
- an immutable model of said vehicle system, said model derived from characteristics of said vehicle system when operating within an environment free of unknown disturbances; and
- means, responsive to said immutable model and said at least one control input, for providing an estimated value of at least one state variable;

(b) means for setting a desired value of said at least one state variable;

(c) measurement means for providing a measured value of said at least one state variable;

(d) comparison means for comparing said estimated value with a corresponding measured value by subtracting said estimated value from said corresponding measured value and for providing at least one estimation error value; and (e) means, responsive to said estimated value, to said at least one estimation error value and to said desired value, for providing said at least one control input to both said vehicle system and said means for providing a vehicle system state estimator, said means for providing at least one control input comprising a controller means, where said at least one control input, in combination with said vehicle dynamics, causes said at least one state variable to approach said desired value of said at least one state variable.

16. An autopilot for the control of the physical state of a vehicle system such as ships, submarines, aircraft and weapons, said vehicle system having system dynamics responsive to at least one control input, wherein said autopilot can accurately maintain said vehicle system in a desired physical state in the presence of an unknown disturbance, said autopilot comprising:

(a) means for providing a vehicle system state estimator comprising:
an immutable model of said vehicle system, said model derived from characteristics of said vehicle system when operating within an environment free of unknown disturbances; and
means, responsive to said immutable model and said at least one control input, for providing an estimated value of at least one state variable;

(b) means for setting a desired value of said at least one state variable;

(c) measurement means for providing a measured value of said at least one state variable;

(d) comparison means for comparing said estimated value with a corresponding measured value by subtracting said estimated value from said corresponding measured value and for providing at least one estimation error value;

(e) a summer means for combining said desired value and said estimated value into a combined desired and estimated value; and (f) means, responsive to said at least one estimation error value and to said combined desired and estimated value, for providing said at least one control input to both said vehicle system and said means for providing a vehicle system state estimator, said means for providing said at least one control input comprising a controller means, the output of the summer means being fed into the controller means, where said at least one control input, in combination with said vehicle dynamics, causes said at least one state variable to approach said desired value of said at least one state variable.

17. An autopilot for the control of the physical state of a vehicle system such as ships, submarines, aircraft and weapons, said vehicle system having system dynamics responsive to at least one control input, wherein said autopilot can accurately maintain said vehicle system in a desired physical state in the presence of an unknown disturbance, said autopilot comprising:

(a) means for providing a vehicle system state estimator comprising:
an immutable model of said vehicle system, said model derived from characteristics of said vehicle system when operating within an environment free of unknown disturbances; and
means, responsive to said immutable model and said at least one control input, for providing an estimated value of at least one state variable;

(b) means for setting a desired value of said at least one state variable;

(c) measurement means for providing a measured value of said at least one state variable;

(d) comparison means for comparing said estimated value with a corresponding measured value by subtracting said estimated value from said corresponding measured value and for providing at least one estimation error value; and (e) means, responsive to said estimated value, to said at least one estimation error value and to said desired value, for providing said at least one control input to both said vehicle system and said means for providing a vehicle system state estimator, said means for providing said at least one control input comprising at least one summer means for combining at least said desired value and said estimated value, a controller means, the output of the summer means being fed into the controller means, where said at least one control input, in combination with said vehicle dynamics, causes said at least one state variable to approach said desired value of said at least one state variable.

* * * * *